June 29, 1937.  B. M. HALL  2,085,359
HELICOPTER
Filed Oct. 9, 1936  3 Sheets-Sheet 1

Inventor

B. M. Hall

By Clarence A. O'Brien
Hyman Berman
Attorneys

Patented June 29, 1937

2,085,359

UNITED STATES PATENT OFFICE 2,085,359

HELICOPTER

Brooks M. Hall, Davidson, Okla.

Application October 9, 1936, Serial No. 104,892

5 Claims. (Cl. 244—17)

This invention relates to a helicopter aircraft and an object of the present invention is to provide a blade arrangement and mounting therefor whereby the blades are used for propelling the aircraft in the direction desired as well as for providing the lifting action for the aircraft.

The invention together with its objects and advantages will be best understood from a study of the following description taken in connection with the accompanying drawings wherein:—

Figure 2 is a longitudinal sectional view illustrating certain details of the mechanism hereinafter more fully referred to.

Figure 5 is a fragmentary detail view illustrating details forming part of the tilting mechanism hereinafter more fully referred to.

Figure 1:
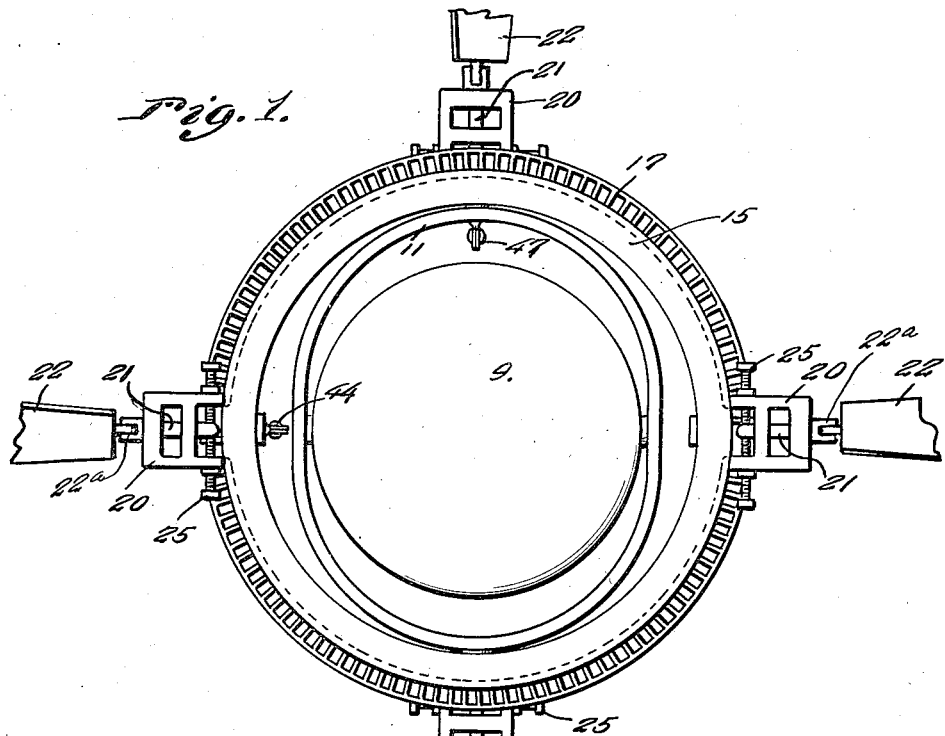
Figure 1 is a top plan view of the helicopter assembly.
Figure 4:
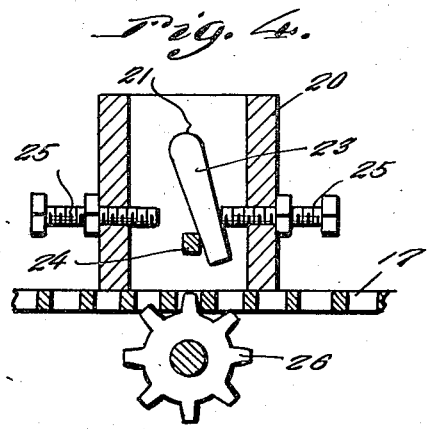
Figure 4 is a sectional view taken substantially on the line 4—4 of Figure 2.
Figure 5:

Referring to the drawings by reference numerals it will be seen that 5 indicates generally a fragmentary portion of an aircraft frame which may be of any suitable structure and design. In accordance with the present invention the top of the plane 5 is provided with an opening 6 with which aligns a cylindrical column or post 7 provided at its lower end with a flange 8 through the medium of which the column is secured to the top of the frame 5. A removable cover cap 9 is preferably provided for the top of the column or post 7.

Mounted on the column 7 are upper and lower blade assemblies indicated generally by the reference numeral 10 and since these blade assemblies are identical in construction and arrangement a detailed description of one will teach the construction of the other. Thus it will be seen that each of the blade assemblies includes an inner frame member 11 pivoted to the column 7 at diametrically opposite sides of the column as at 12.

Disposed concentric to the frame 11 is an annulus or ring 13 which is pivoted to the frame 11 at diametrically opposite sides of the frame 11 and at right angles to the pivots 12 as at 14.

The ring 13 supports for rotative movement relative thereto a power ring 15 provided at its upper edge with a lateral flange 16 the inner edge portion of which rides on the upper edge of the ring 13.

Secured to the lower edge of the power ring 15 is an annular rack 17, the rack 17 being secured to the ring 15 as at 18.

Disposed about the ring 15 and confined in position between the outer edge of the flange 16 and the rack 17 is a ring 19 that is provided at diametrically opposite sides thereof with bearing frames 20 in which are journaled the shaft 21 of propeller blades 22.

The shafts 21 of said propeller blades 22 have down turned end portions 23 for engaging pins 24 that project from the power ring 15 so that as the ring 15 starts to rotate in either of two directions arms 24 thereon will engage the ends 23 of the propeller shafts to change the pitch of the propeller blades. Also by reason of the engagement of the ends 23 of the propeller shafts with the pins 24 movement of the power ring 15 will be transmitted to the ring 19 so that the power ring 15 and ring 19 will then rotate as a unit with the blades 22 disposed at the proper pitch.

For controlling the pitch-change of the blades 22 each bearing frame 20 is provided at opposite sides thereof with adjusting screws 25 which selectively cooperate with the pins 24 to secure the ends 23 of the propeller shafts 21 therebetween so that the pitch of the propellers 22 will not vary after the rotation of the ring 15 is completely under way.

In actual practice the power ring 15 of the upper blade assembly 10 will rotate in one direction while the power ring 15 of the lower blade assembly will rotate in a reverse direction so that there is one pair of blades rotating in one direction and the other pair of blades rotating in a reverse direction so that one set of blades will counteract the torque of the other set of blades.

It will also be understood that by tilting the blade assemblies the direction of travel of the aircraft is controlled the aircraft drifting in the direction toward which the blade assemblies are tilted. For example, if the blade assemblies are tilted toward the right the aircraft will take a direction toward the right or if the blade assemblies are in tilted position toward the left the path of travel of the aircraft will be toward the left; while if the blade assemblies are tilted forwardly, that is toward the front end of the aircraft, the aircraft will take a forward direction while if the blade assemblies are tilted rearwardly, that is to say toward the rear end of the aircraft the direction of travel of the aircraft will be reversed.

Also the driving means for the rings 15 are identical, the driving means for each ring 15 consisting of the aforementioned circular rack 17 with which a pinion gear 26 is in constant mesh.

The gear 26 is provided on one end of a shaft 27 that is journaled in a depending bearing 28 depending from the frame 13, and a shaft 27 extends through a suitable slot 29 provided in the wall of the column 7. At its inner end the shaft 27 has sleeved thereon a shaft section 30 that is retained against rotation relative to the shaft 27 through the medium of complemental keys and ways engaging in the keys and is indicated generally at 31.

The shaft section 30 has a universal connection 32 with a shaft section 33 that is journaled in a suitable bearing bracket 34 provided in the column 7. Shaft 33 in turn is driven from a vertical shaft 35 through the medium of bevelled gearing 36.

The shaft 35 extends upwardly through the column 7 and has its upper end journaled in a suitable bearing bracket 37.

The shaft 35 is connected in any suitable manner with a source of power such as an internal combustion engine or the like (not shown). It will thus be seen that for each of the propeller assemblies 10 drive will be transmitted from a shaft 35 to the shaft 27 and from the shaft 27 through the pinion 26 and rack 17 to the ring 15 for causing the latter to revolve about the ring 13 as an axis.

For tilting the rings 11 on their pivots 12 there is provided a control rod 38 which adjacent its upper end is provided with a socket 39 to receive the ball head 40 on the pivots 14 of the lower propeller assembly, while at said socket equipped end there is pivoted to the rod 38 a link 41 which has pivoted thereto as at 42 a socket 43 that engages a ball head 44 provided on one of the pivots 14 of the upper propeller assembly 10.

Figure 2:
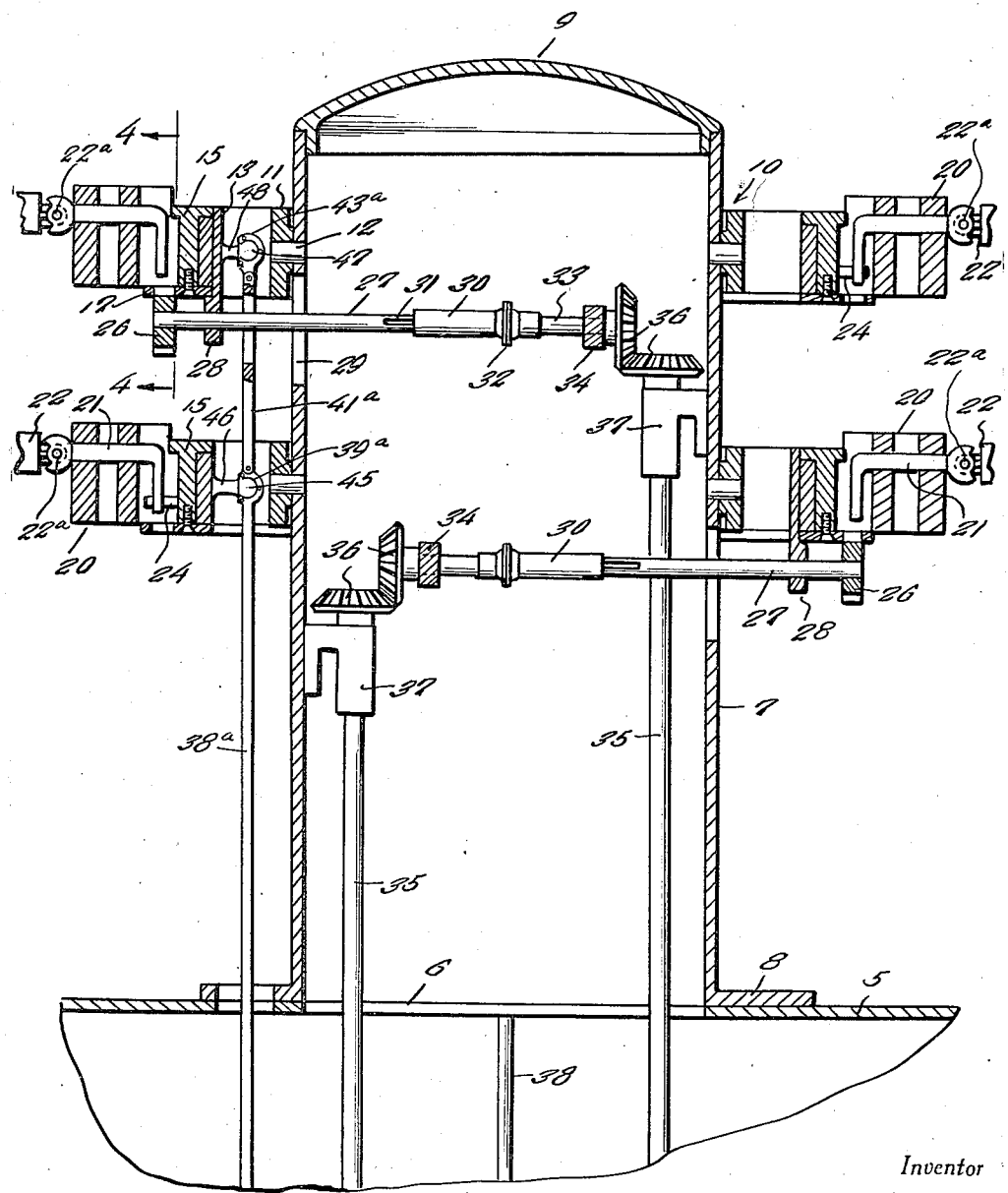

A somewhat similar arrangement is provided for tilting the rings 13 of the propeller assemblies, this arrangement being shown in Figure 2 and consisting of a control rod 38a, a socket 39a provided on the upper end of the rod 38a and engaging the ball head 45 formed on one end of a stud 46 that extends inwardly from the ring 13 of the lower blade assembly 10. Pivoted to the socket equipped end of the rod 38a is a link 41a which has pivoted to its upper end a socket 43a that engages the ball head 47 provided on a stud 48 that projects inwardly from the ring 13 of the upper blade assembly 10.

Figure 3:
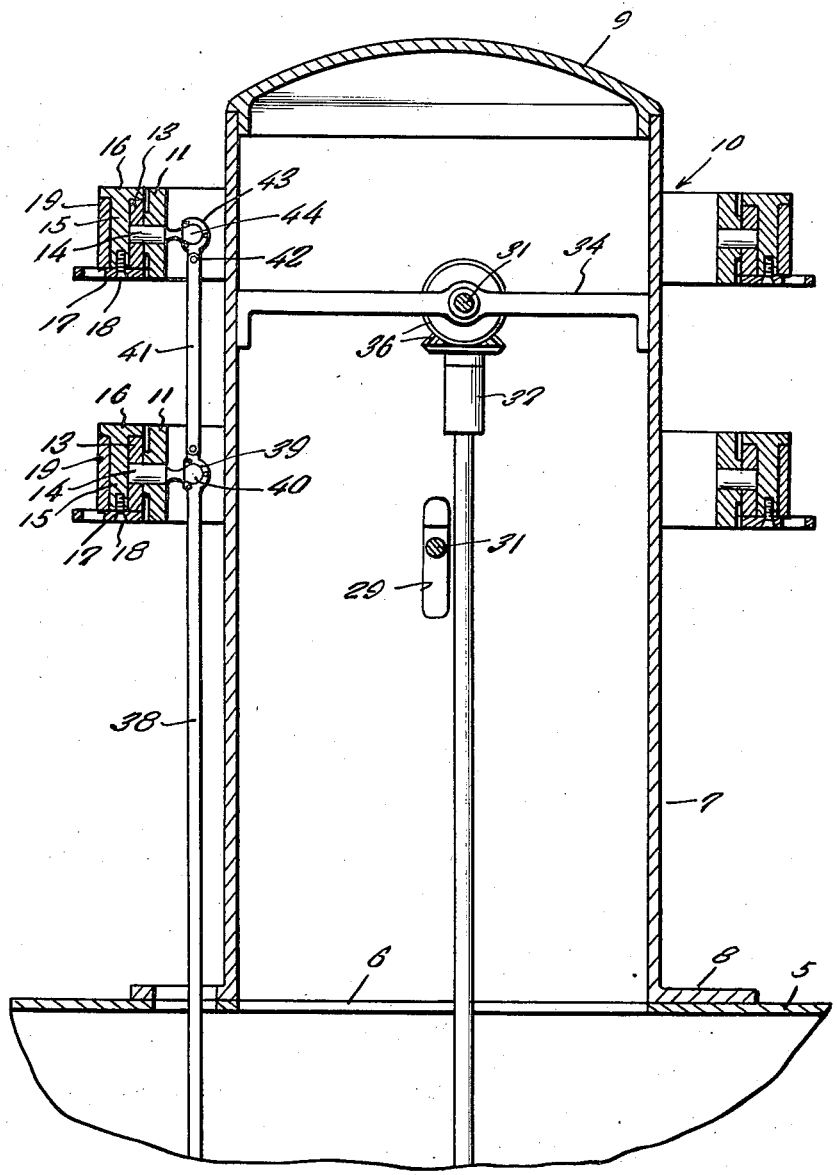
Figure 3 is a view taken substantially at right-angles to Figure 2.

The control rods 38, 38a extend through suitable openings provided therefor in the base flange 8 of the column 7 and in the top of the frame 5 of the aircraft as clearly shown in Figures 3 and 2.

It will thus be seen that by pushing upwardly on the control rod 38 the frames 11 of the propeller assemblies will be caused to rock on their pivots 12 in one direction while pulling downwardly on the control rod 38 said frames 11 will be caused to rock in a reverse direction. Also by pushing upwardly on the control rod 38a the rings 13 of the propeller assemblies will be caused to rock in one direction on their pivots 14 while a downward pull on the control rod 38a will cause the rings 13 to rock on their pivots 14 in a reverse direction. Thus it will be seen that the propeller assemblies can be tilted either forwardly or rearwardly or to the right or left as may be found desirable for changing the direction of travel of the aircraft.

In actual practice the control rods 38, 38a will be suitably connected to a control stick "not shown" arranged in the cabin of the aircraft in such a manner as to permit operation of the control stick as found desirable.

For the purpose of eliminating gyroscopic action of blades 22, to reduce vibration and to permit greater ease of control by utilizing centrifugal force for holding the blades to a substantially horizontal position while the aeroplane is in motion, the blades 22 are preferably hinged to their shafts 21 as at 22a for vertical swinging movement relative to the shaft 21. In this connection it will be understood if the aeroplane is rising or descending vertically the airspeed of the propellers is the same in the complete arc of travel, but if the aeroplane has a forward speed one half of the arc of travel of the blades will be greater than the other half of said arc, that is to say the blade will have greater air speed when revolving in a direction corresponding to the direction of movement of the aeroplane, than were they rotating in a direction in reverse to the direction of travel of the aeroplane. Consequently more lift will be produced on one side than on the other and the hinge connection between the blades and their shaft allow the blade to rise and drop as may be necessary to take care of uneven lift.

It is thought that a clear understanding of the construction, utility and advantages of a helicopter assembly for aircraft embodying the features of the present invention will be understood without a more detailed description.

Having thus described the invention what is claimed is:—

1. In an aircraft of the character described, a fuselage, a column rising vertically from the top of the fuselage and propeller assemblies mounted on the fuselage in vertically spaced relation and rotatable in reverse directions relative to one another, each of said propeller assemblies including a supporting frame disposed about the column and supported therefrom for tilting movement in either of two directions, an annular frame disposed about the first mentioned frame and supported therefrom for tilting movement in either of two directions and on pivots disposed at right angles to the pivots for the first mentioned supporting frame, a power ring surrounding the second mentioned supporting frame and supported therefrom for rotative movement relative to the second mentioned supporting frame and propeller blades radially disposed at diametrically opposite sides of the power ring and movable therewith, and driving means for the power ring.

2. In an aircraft of the character described, a fuselage, a column rising vertically from the top of the fuselage and propeller assemblies mounted on the fuselage in vertically spaced relation and rotatable in reverse directions relative to one another, each of said propeller assemblies including a supporting frame disposed about the column and supported therefrom for tilting movement in either of two directions, an annular frame disposed about the first mentioned frame and supported therefrom for tilting movement in either of two directions and on pivots disposed at right angles to the pivots for the first mentioned supporting frame, a power ring surrounding the second mentioned supporting frame and supported therefrom for rotative movement relative to the second mentioned supporting frame, a second ring loosely disposed about the power ring and provided at diametrically opposite sides thereof with radially extending bearings, propeller blades having their shafts journaled in said bearings, and interengaging means on the blade shafts and on the power ring for changing the pitch of the propeller blades and for transmitting movement of the power ring to the blades to cause said blades and power rings to rotate about the second mentioned supporting frame as a unit.

3. In an aircraft of the character described, a fuselage, a column rising vertically from the top of the fuselage and propeller assemblies mounted on the fuselage in vertically spaced relation and rotatable in reverse directions relative to one another, each of said propeller assemblies including a supporting frame disposed about the column and supported therefrom for tilting movement in either of two directions, an annular frame disposed about the first mentioned frame and supported therefrom for tilting movement in either of two directions and on pivots disposed at right angles to the pivots for the first mentioned supporting frame, a power ring surrounding the second mentioned supporting frame and supported therefrom for rotative movement relative to the second mentioned supporting frame, a second ring loosely disposed about the power ring and provided at diametrically opposite sides thereof with radially extending bearings, propeller blades having their shafts journaled in said bearings, and interengaging means on the blade shafts and on the power ring for changing the pitch of the propeller blades and for transmitting movement of the power ring to the blades to cause said blades and power rings to rotate about the second mentioned supporting frame as a unit, means operatively connected with the propeller assemblies for tilting the first mentioned supporting frames of said assemblies in unison, and means operatively connected with the second mentioned supporting frames of the propeller assemblies for tilting the second mentioned supporting frames in unison.

4. In an aircraft of the character described, a fuselage, a column rising vertically from the top of the fuselage and propeller assemblies mounted on the fuselage in vertically spaced relation and rotatable in reverse directions relative to one another, each of said propeller assemblies including a supporting frame disposed about the column and supported therefrom for tilting movement in either of two directions, an annular frame disposed about the first mentioned frame and supported therefrom for tilting movement in either of two directions and on pivots disposed at right angles to the pivots for the first mentioned supporting frame, a power ring surrounding the second mentioned supporting frame and supported therefrom for rotative movement relative to the second mentioned supporting frame, a second ring loosely disposed about the power ring and provided at diametrically opposite sides thereof with radially extending bearings, propeller blades having their shafts journaled in said bearings, and interengaging means on the blade shafts and on the power ring for changing the pitch of the propeller blades and for transmitting movement of the power ring to the blades to cause said blades and power ring to rotate about the second mentioned supporting frame as a unit, means operatively connected with the propeller assemblies for tilting the first mentioned supporting frames of said assemblies in unison, and means operatively connected with the second mentioned supporting frames of the propeller assemblies for tilting the second mentioned supporting frame in unison, and driving means for the power rings of said assemblies.

5. In an aircraft of the character described, a fuselage, a column rising vertically from the top of the fuselage and propeller assemblies mounted on the fuselage in vertically spaced relation and rotatable in reverse directions relative to one another, each of said propeller assemblies including a supporting frame disposed about the column and supported therefrom for tilting movement in either of two directions, an annular frame disposed about the first mentioned frame and supported therefrom for tilting movement in either of two directions and on pivots disposed at right angles to the pivots for the first mentioned supporting frame, a power ring surrounding the second mentioned supporting frame and supported therefrom for rotative movement relative to the second mentioned supporting frame, a second ring loosely disposed about the power ring and provided at diametrically opposite sides thereof with radially extending bearings, propeller blades having their shafts journaled in said bearings, and interengaging means on the blade shafts and on the power ring for changing the pitch of the propeller blades and for transmitting movement of the power ring to the blades to cause said blades and power ring to rotate about the second mentioned supporting frame as a unit, means operatively connected with the propeller assemblies for tilting the first mentioned supporting frames of said assemblies in unison, means operatively connected with the second mentioned supporting frames of the propeller assemblies for tilting the second mentioned supporting frame in unison, driving means for the power rings of said assemblies, said driving means including an annular rack secured to a power ring and a power driven pinion in constant mesh with said rack.

BROOKS M. HALL.